US 9,185,952 B1
Nov. 17, 2015

(12) United States Patent
Turney et al.

(54) CONVERTIBLE WHEELED BACKPACKING ACCESSORY

(71) Applicants: Daniel Payton Turney, Loomis, CA (US); Aaron Turney, Apex, NC (US)

(72) Inventors: Daniel Payton Turney, Loomis, CA (US); Aaron Turney, Apex, NC (US)

(73) Assignee: Daniel Payton Turney, Loomis, CA (US)

( * ) Notice: Subject to any disclaimer, the term of this patent is extended or adjusted under 35 U.S.C. 154(b) by 248 days.

(21) Appl. No.: 13/933,809

(22) Filed: Jul. 2, 2013

Related U.S. Application Data

(60) Provisional application No. 61/667,315, filed on Jul. 2, 2012.

(51) Int. Cl.
*A45C 5/14* (2006.01)
*A45C 13/38* (2006.01)
*A45C 3/10* (2006.01)
*B62B 5/06* (2006.01)
*A45F 3/08* (2006.01)
*A45F 4/02* (2006.01)

(52) U.S. Cl.
CPC ... *A45C 5/14* (2013.01); *A45C 3/10* (2013.01); *A45C 13/385* (2013.01); *A45F 3/08* (2013.01); *A45F 4/02* (2013.01); *B62B 5/068* (2013.01)

(58) Field of Classification Search
CPC ........ B62B 1/04; B62B 1/08; B62B 2205/10; B62B 2205/21; B62B 2205/121; B62B 2205/123; B62B 1/20; B62B 1/266; B62B 5/0083; B62B 5/068; A45C 5/14; A45C 13/385; A45C 3/10; A45F 3/08; A45F 4/02
See application file for complete search history.

(56) References Cited

U.S. PATENT DOCUMENTS

| | | | | |
|---|---|---|---|---|
| 2,365,174 A * | 12/1944 | Cochran | 280/18 |
| 2,559,981 A * | 7/1951 | McBride | 224/184 |
| 3,311,385 A * | 3/1967 | Frantz | 280/1.5 |
| 3,560,015 A * | 2/1971 | Tracy et al. | 280/47.3 |
| 3,758,128 A * | 9/1973 | Stenwall | 280/47.25 |
| 3,856,191 A * | 12/1974 | Pohl | 224/262 |
| 4,017,091 A * | 4/1977 | Wallen | 280/30 |
| 4,593,841 A * | 6/1986 | Lange | 224/153 |
| 5,193,842 A * | 3/1993 | Fontenot | 280/645 |
| 5,215,318 A * | 6/1993 | Capraro | 280/1.5 |
| 5,632,496 A * | 5/1997 | Nelson | 280/30 |
| 5,879,022 A * | 3/1999 | Winton | 280/655 |
| 6,375,200 B1 * | 4/2002 | Harter | 280/30 |
| 6,755,428 B2 * | 6/2004 | Butler | 280/47.26 |
| 7,114,730 B2 * | 10/2006 | Cheldin | 280/47.24 |
| 7,717,309 B1 * | 5/2010 | Lehmberg | 224/154 |
| 8,056,781 B1 * | 11/2011 | Rowe | 224/184 |
| 8,641,056 B1 * | 2/2014 | Carter | 280/30 |
| 2006/0237918 A1 * | 10/2006 | Satorius | 280/1.5 |
| 2007/0075105 A1 * | 4/2007 | Petrin | 224/153 |
| 2010/0032464 A1 * | 2/2010 | Gleason, Jr. | 224/631 |
| 2011/0068560 A1 * | 3/2011 | Wilson et al. | 280/514 |
| 2012/0126499 A1 * | 5/2012 | Nieman | 280/30 |

* cited by examiner

Primary Examiner — Tri Mai

(57) ABSTRACT

A convertible wheeled backpacking accessory attaches to a backpack to carry the backpack over both rugged terrain and rolling terrain efficiently. The convertible wheeled backpacking accessory includes a cradle that has a cradle frame covered in part by a cradle material wherein the cradle can support the backpack. Frame pegs are attached to the cradle frame which pierce the cradle material and can accommodate wheels when the backpack is being carried over the rugged terrain. A frame axel is attached to the cradle frame and extending outside the cradle material. The frame axel can accommodate the wheels when the backpack is being carried over rolling terrain.

2 Claims, 4 Drawing Sheets

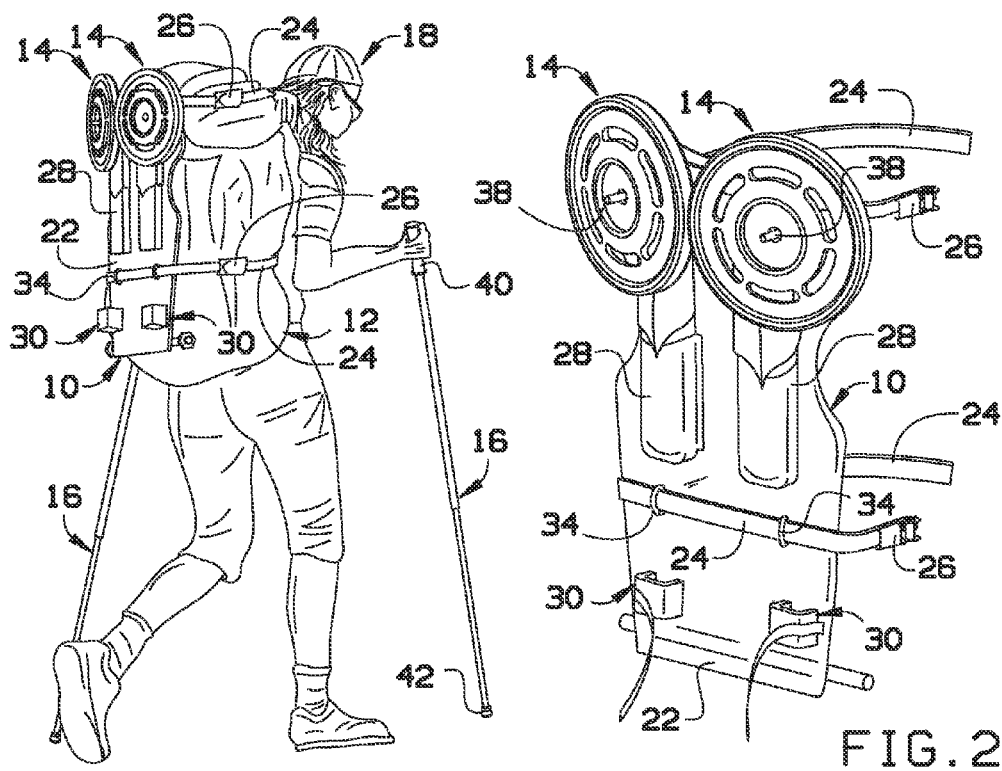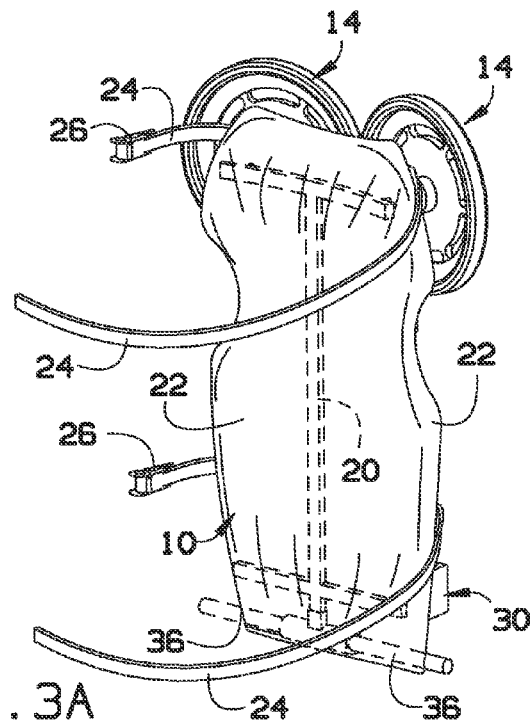

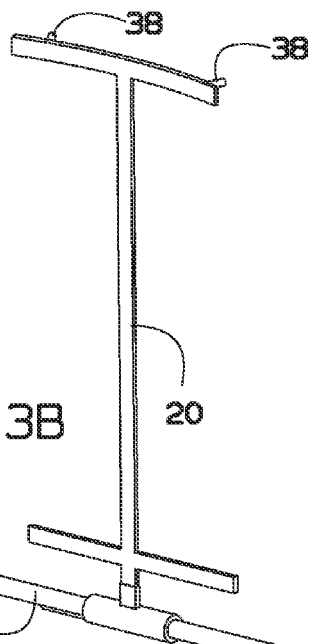
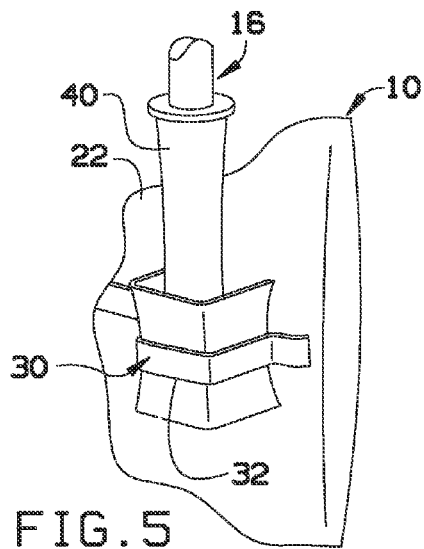
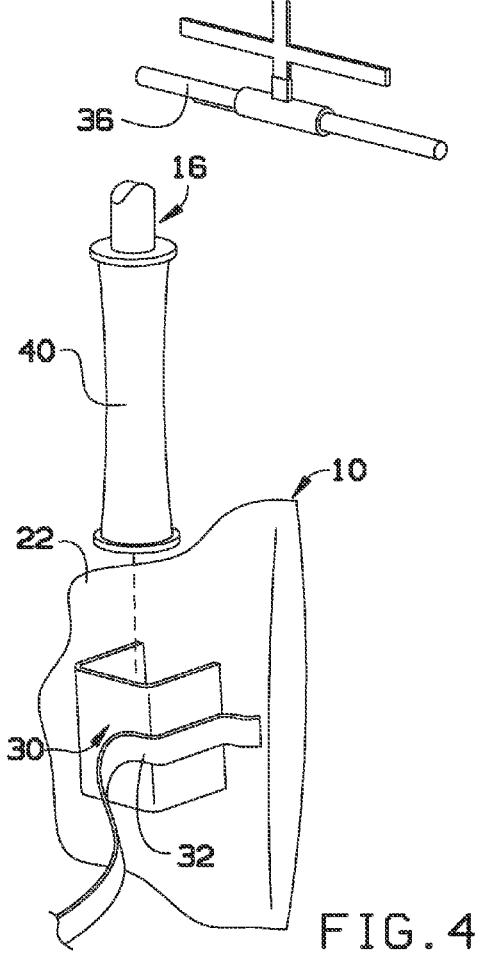
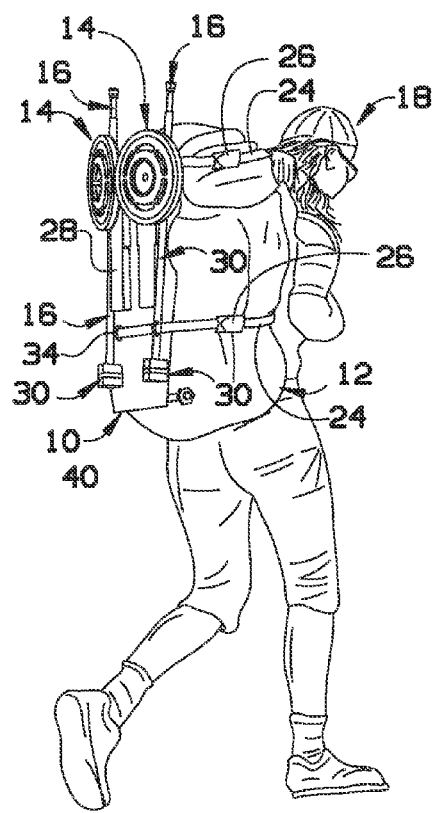
FIG. 3B
FIG. 5
FIG. 4
FIG. 6

CONVERTIBLE WHEELED BACKPACKING ACCESSORY

RELATED APPLICATION

This application claims priority to provisional patent application U.S. Ser. No. 61/667,315 filed on Jul. 2, 2012, the entire contents of which is herein incorporated by reference.

BACKGROUND

The embodiments herein relate generally to devices that can be used to transport goods from one location to another.

Prior to embodiments of the disclosed invention, cross country, back country, long-distance backpackers had been forced to carry their packs on their backs for the duration of the trek often resulting in fatigue, chafing, and impact injuries to knees, hips sometimes resulting in back pain.

Prior art wheeled backpacks or luggage were not designed to handle rocky, muddy, rooted and rough terrain. They were not readily convertible to a non-wheeled backpack. They were not designed to work with a large sized backpack, and they were not designed to function in a hands-free capacity. For instance the prior art includes: U.S. Pat. No. 7,036,641 issued to Chi; U.S. Pat. No. 6,877,752 issued to Edwards; U.S. Patent Application Publication 2006/0237918 filed by Satorius.

Chi teaches a backpack transportation system comprising a frame mechanically coupled to a handle and a wheel assembly, it utilizes holes in the frame and dowels on the backpack to hold the device in place and does not teach wheels that can handle rough terrain.

Edwards teaches an enhanced wheel assembly for luggage which appears to include a rack that can be placed through a hole in the luggage rather than being attached with a web belt. The wheels could conceivably handle rough terrain, but there is no theory as how a hiking pole could be used.

Satorius teaches a luggage transportation system comprising a frame mechanically coupled to a wheel that appears to handle rough terrain and a web belt that can hold luggage in place. There is no theory on use of a hiking pole.

SUMMARY

A convertible wheeled backpacking accessory attaches to a backpack to carry the backpack over both rugged terrain and rolling terrain efficiently. The convertible wheeled backpacking accessory includes a cradle that has a cradle frame covered in part by a cradle material wherein the cradle can support the backpack. Frame pegs are attached to the cradle frame which pierce the cradle material and can accommodate wheels when the backpack is being carried over the rugged terrain. A frame axel is attached to the cradle frame and extending outside the cradle material. The frame axel can accommodate the wheels when the backpack is being carried over rolling terrain.

In some embodiments, a first pole holder is mechanically coupled to the cradle material and further mechanically coupled to a first pole ratchet such that a user can secure a first pole in the first pole holder with the first pole ratchet. A second pole holder mechanically coupled to the cradle material and further mechanically coupled to a second pole ratchet such that the user can secure a second pole in the second pole holder with the second pole ratchet. Each pole comprises a nub attached to a ball assembly with an elastic band; the ball assembly can be further attached to a ball joint receiver and the ball joint receiver is mechanically coupled to a hiking belt. In this manner, the backpack can be pulled hands-free.

BRIEF DESCRIPTION OF THE FIGURES

The detailed description of some embodiments of the invention is made below with reference to the accompanying figures, wherein like numerals represent corresponding parts of the figures.

FIG. 1 is a perspective view of an embodiment of the invention in use attached to the backpack demonstrated in carrying configuration with item the poles not attached.

FIG. 2 is a back perspective view of an embodiment of the invention.

FIG. 3A is a front perspective view of an embodiment of the invention.

FIG. 3B is a front perspective view of an embodiment of the cradle frame only.

FIG. 4 is an exploded detail view of an embodiment of the invention demonstrating insertion of an embodiment of the pole into the pole holder.

FIG. 5 is a perspective detail view of an embodiment of the invention demonstrating post-insertion of an embodiment of the pole into the pole holder.

FIG. 6 is a perspective view of an embodiment of the invention in use attached to the backpack demonstrated in carrying configuration with the poles not attached.

DETAILED DESCRIPTION OF CERTAIN EMBODIMENTS

Figure 9:
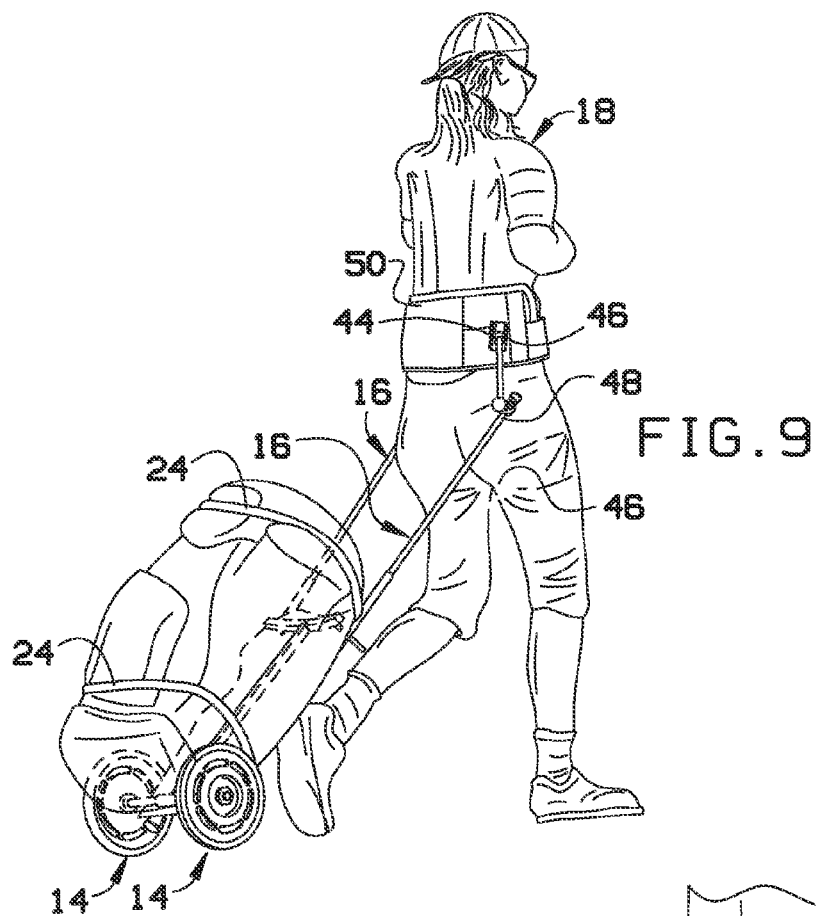
FIG. 9 is a perspective view of an embodiment of the invention in use attached to the backpack demonstrated in tow configuration.

Turning to FIG. 1, in some embodiments, user 18 desires to be able to easily transfer from backpack 12 from being carried on the user's back as shown in FIG. 1 when travelling over rugged terrain. In some embodiments, backpack 12 is a large backpack. Being carried on the user's back with hiking poles 16 as shown in FIG. 6. Being dragged behind the user from a belt as shown in FIG. 9 which might be preferably on rolling terrain. As used in the application "rolling terrain" means any terrain where wheels 14 would be permitted to roll. "Rough terrain" means any terrain where wheels 14 would not be permitted to roll. Hiking poles 16 are preferably expandable and mechanically coupled to pole handle 40 proximate a first and to pole numb 42 at a second end. Cradle 10 can accomplish all of this.

By way of example, and referring to FIG. 1, FIG. 2 and FIG. 3A, one embodiment of the present system comprises cradle 10, which is sufficiently sized to accommodate a full backpack 12 of the variety commonly used in cross country, back country, long-distance backpacking. Cradle 10 comprises cradle frame 20 which is shown in more detail in FIG. 3B. Cradle frame 20 is covered with cradle material 22. Cradle material 22 is mechanically coupled to first lower ring 34 and second lower ring 34 with can accommodate lower attachment strap 24. Cradle material 22 is mechanically coupled to first upper ring 34 and second upper ring 34 with can accommodate upper attachment strap 24. Cradle material 22 is further mechanically coupled to pole holder 30 as shown in more detail in FIG. 4 and FIG. 5. In some embodiments cradle material 22 is mechanically coupled to left pocket 28 and right pocket 28.

FIG. 3B shows cradle frame 20 in more detail. Cradle frame 20 can take the shape of a single vertical member mechanically coupled to two horizontal members in order to provide structural support for cradle 10. Cradle frame 20 is further mechanically coupled to frame axel 36 that is configured to rest outside of cradle material 22. Cradle frame 20 is further mechanically coupled to frame pegs 38 which extend through cradle frame 20 to accommodate wheels 14 as shown in FIG. 1 and FIG. 6. In some embodiments, an eyelet surrounds each frame peg 38 as it transitions through cradle frame 20.

FIG. 4 and FIG. 5 show how pole holder 30 can be used to accommodate pole 16. Pole holder 30 is made from a collapsible material sewn to cradle material 22. Pole ratchet 32 is also attached to cradle material 22 and is wrapped around pole holder 30 to compress handle 40 immediately against cradle material 22 holding handle 40 in place. This allows a user to carry backpack 12 over rough terrain while easily transporting poles 16, if so desired as shown in FIG. 6.

It is preferable, but not required to utilize two poles 16 as follows. A first pole holder 30 is mechanically coupled to cradle material 22 and further mechanically coupled to a first pole ratchet 32 such that a user can secure a first pole 16 in the first pole holder 30 with the first pole ratchet 32. A second pole holder 30 is mechanically coupled to cradle material 22 and further mechanically coupled to a second pole ratchet 32 such that the user can secure a second pole 16 in the second pole holder 30 with the second pole ratchet 32.

Figure 7:
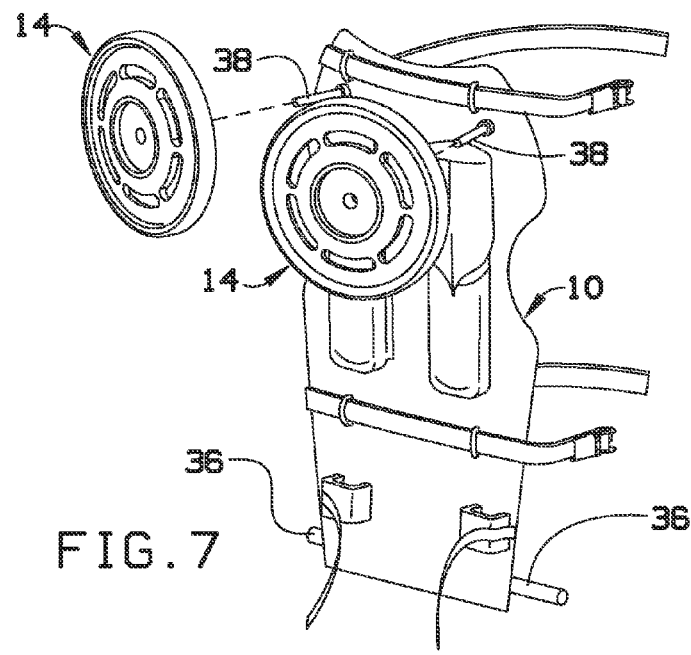
FIG. 7 is a perspective view of an embodiment of the invention demonstrating the wheels in detachment phase.
Figure 8:
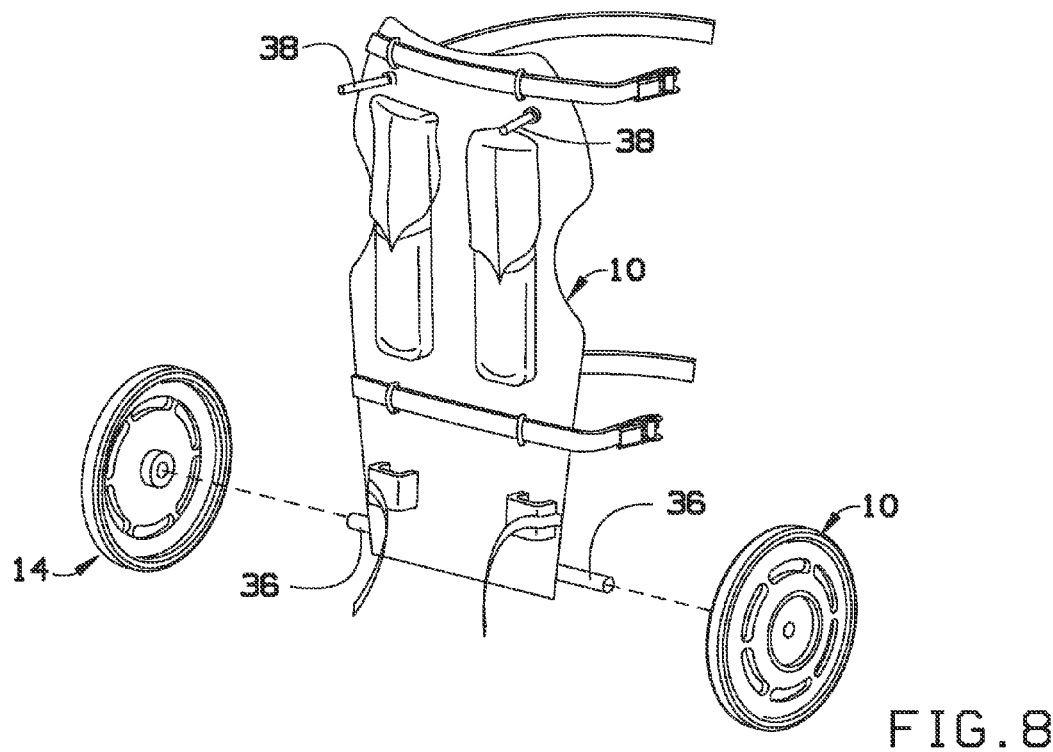
FIG. 8 is a perspective view of an embodiment of the invention demonstrating the wheels in attachment phase.

FIG. 7 and FIG. 8 demonstrate how easy it is for user 18 to convert cradle 10 from an unwheeled cradle to a wheeled cradle. User 18 simply removes wheels 14 from frame pegs 38 and inserts wheels 14 onto frame axel 36. Wheels 14 should be spread apart a distance greater than the width of backpack 12 for maximum efficiency.

Figure 10:
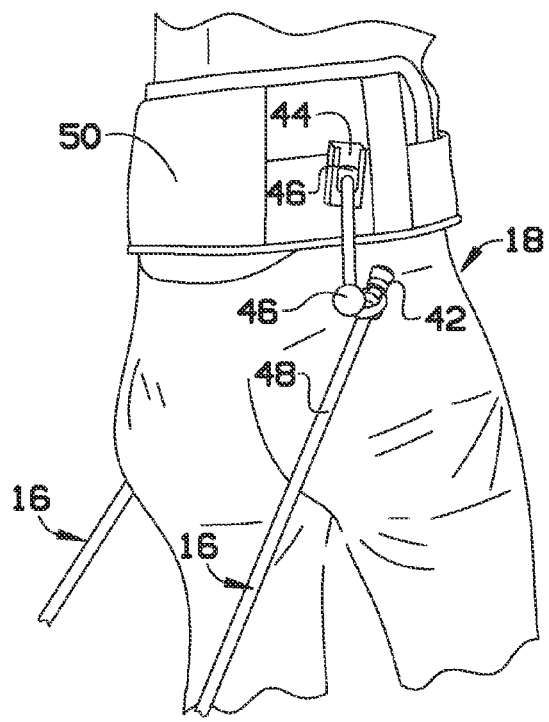
FIG. 10 is a detail perspective view of an embodiment of the invention demonstrating attachment method of invention to the user.

FIG. 9 and FIG. 10 show how cradle 10 can be attached to user 18 wearing hiking belt 50. Hiking belt 50 is mechanically coupled to ball joint receiver 44. A ball assembly comprises first ball 46 mechanically coupled to a longitudinal member. The longitudinal member is further mechanically coupled to second ball 46. First ball 46 rests inside ball joint receiver 44 and second ball 46 is attached proximate nub 42 with elastic band 48. This allows user 18 to hike while easily rolling backpack 12 along.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A convertible wheeled backpacking accessory configured to attach to a backpack to carry the backpack over both rugged terrain and rolling terrain efficiently; the convertible wheeled backpacking accessory comprising:

a cradle comprising a cradle frame covered in part by a cradle material wherein the cradle can support the backpack;

frame pegs mechanically coupled to the cradle frame which pierce the cradle material and can accommodate wheels when the backpack is being carried over the rugged terrain;

a frame axel mechanically coupled to the cradle frame and extending outside the cradle material; wherein the frame axel can accommodate the wheels when the backpack is being carried over rolling terrain;

a first pole holder mechanically coupled to the cradle material and further mechanically coupled to a first pole ratchet such that a user can secure a first pole in the first pole holder with the first pole ratchet;

a second pole holder mechanically coupled to the cradle material and further mechanically coupled to a second pole ratchet such that the user an secure a second pole in the second pole holder with the second pole ratchet; and each pole comprises a nub attached to a ball assembly with an elastic band; the ball assembly can be further attached to a ball joint receiver and the ball joint receiver is mechanically coupled to a hiking belt;

wherein the backpack can be pulled hands-free.

2. The convertible wheeled backpacking accessory of claim 1, wherein the cradle material is mechanically coupled to a plurality of rings which can accommodate an upper attachment strap an a lower attachment strap to secure the backpack.

* * * * *